US009191182B2

(12) United States Patent
Liu et al.

(10) Patent No.: US 9,191,182 B2
(45) Date of Patent: Nov. 17, 2015

(54) DATA TRANSMISSION METHOD AND ASSOCIATED SIGNAL TRANSMITTER

(71) Applicant: MStar Semiconductor, Inc., Hsinchu Hsien (TW)

(72) Inventors: Hsian-Feng Liu, Zhubei (TW); Chun-Chia Chen, Zhubei (TW); Kai-Fei Chang, Zhubei (TW); Chao-An Chen, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/591,052

(22) Filed: Jan. 7, 2015

(65) Prior Publication Data
US 2015/0195080 A1  Jul. 9, 2015

(30) Foreign Application Priority Data
Jan. 8, 2014 (TW) .............................. 103100697 A

(51) Int. Cl.
*H04L 7/00* (2006.01)
(52) U.S. Cl.
CPC ............ *H04L 7/0012* (2013.01); *H04L 7/0091* (2013.01)

(58) Field of Classification Search
CPC ............... G06F 1/10; G06F 1/04; G06F 1/08; G06F 1/06; G06F 1/105; H04J 3/0679; H04L 7/0337; H04L 7/0012; H04L 7/0091; H04Q 2213/13214
USPC ........... 375/295, 354; 327/141, 144, 152, 100
See application file for complete search history.

(56) References Cited

U.S. PATENT DOCUMENTS

2003/0042947 A1* 3/2003 Demone ........................ 327/156
2003/0094937 A1* 5/2003 Soma et al. ................. 324/76.39
2004/0113668 A1* 6/2004 Gaskins et al. ............... 327/158

* cited by examiner

Primary Examiner — Vineeta Panwalkar
(74) Attorney, Agent, or Firm — Edell, Shapiro & Finnan, LLC

(57) ABSTRACT

A signal transmission method suitable for a signal transmitter includes: providing a plurality of clock signals with different phases, selecting some of the clock signals as a plurality of intermediate signals; transmitting the intermediate signals to a signal output circuit via a clock distribution network; selecting one of the intermediate signals as a reference clock of the signal output circuit to output data.

15 Claims, 5 Drawing Sheets

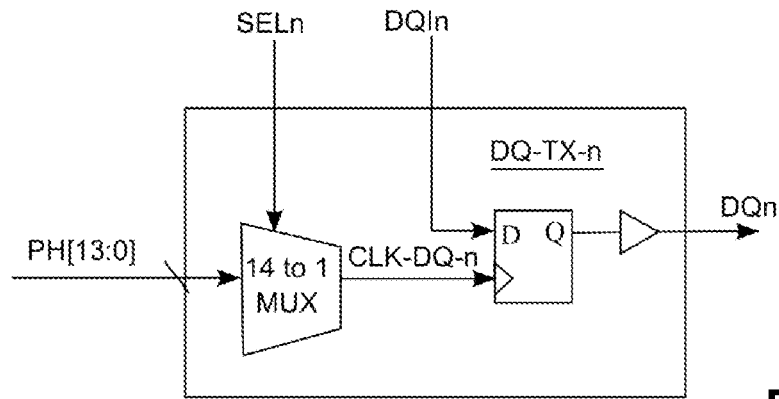
FIG. 5
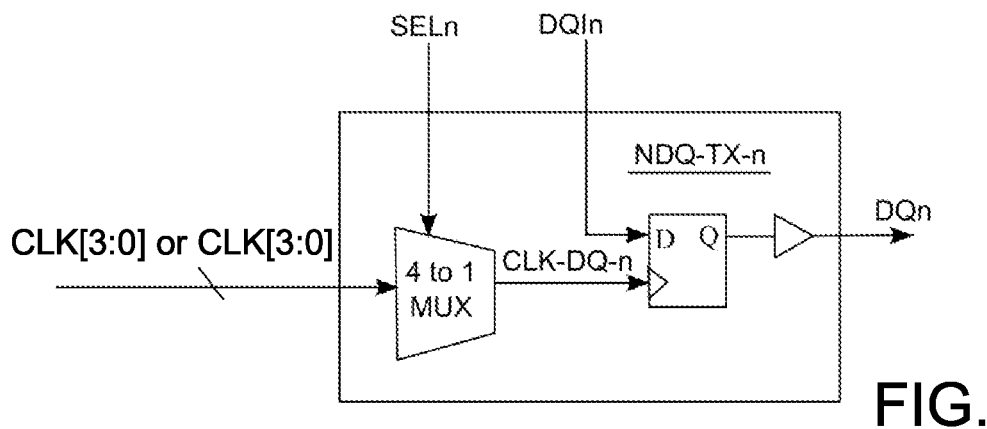
FIG. 7
| GRP-CTRL-L | CLKL[0] | CLKL[1] | CLKL[2] | CLKL[3] |
|---|---|---|---|---|
| 0 | PH[0] | PH[1] | PH[2] | PH[3] |
| 1 | PH[2] | PH[3] | PH[4] | PH[5] |
| 2 | PH[4] | PH[5] | PH[6] | PH[7] |
| 3 | PH[6] | PH[7] | PH[8] | PH[9] |
| 4 | PH[8] | PH[9] | PH[10] | PH[11] |
| 5 | PH[10] | PH[11] | PH[12] | PH[13] |
FIG. 8

DATA TRANSMISSION METHOD AND ASSOCIATED SIGNAL TRANSMITTER

This application claims the benefit of Taiwan application Serial No. 103100697, filed Jan. 8, 2014, the subject matter of which is incorporated herein by reference.

BACKGROUND OF THE INVENTION

1. Field of the Invention

The invention relates in general to a signal transmitter, and more particularly to a signal transmitter having a deskew function.

2. Description of the Related Art

Data transmission between electronic elements is usually achieved through changing or coupling/conducting data signals on conducting lines. Data transmission of a group of multiple data bits simultaneously completed through multiple transmission channels is referred to as parallel transmission. On the other hand, data transmission of data bits transmitted one after another through one single transmission channel is referred to as serial transmission.

Compared to serial transmission, parallel transmission is in general faster, and is more commonly applied to environments with shorter transmission channels between electronic elements. For example, data transmission between integrated circuits on a printed circuit board and data transmission between a printer and a personal computer mostly adopt parallel transmission. Long-distance parallel transmission may be affected by signal propagation delay differences between the parallel channels. In the occurrence of such signal propagation delay differences, multiple data bits that are expectedly to simultaneously arrive at a destination are often caused to arrive at a destination receiver at different time points. Differences in the arrival time are referred to as skew in the technical field.

For shorter transmission channels or moderate transmission speeds, the skew barely results in noticeable effects and can be neglected. However, as the transmission channel gets longer or the transmission speed increases, quantitative values and differences of such signal propagation delay may become quite apparent, hence an increase in the skew. With an excessive skew, a data bit originally belonging to a particular byte may be erroneously considered as a member of a previous or next byte, leading to a data transmission error.

In a convention approach for processing the skew, differences of signal propagation delays of individual channels at a receiver are first identified, i.e., offset values of the individual channels, and temporal compensations are then correspondingly provided at the receiver. For example, for a transmission channel that has a shorter signal propagation, delay is first provided with an additional signal delay by a filter at a receiver, such that the data bits in the transmission channel are regarded as being received at a later time point. Thus, a deskew function can be achieved at the receiver.

SUMMARY OF THE INVENTION

According to an embodiment of the present invention, a signal transmission method is provided. The signal transmission method, suitable for a signal transmitter, includes: providing a plurality of clock signals with different phases; selecting some of clock signals as intermediate signals; transmitting the intermediate signals to a signal output circuit via a clock distribution network; and selecting one of the intermediate signals as a reference clock of the signal output circuit to output data.

According to another embodiment of the present invention, a signal transmitter is provided. The signal transmitter includes a clock generator, a group selection circuit, a signal output circuit and a clock distribution network. The clock generator provides a plurality of clock signal with different phases. According to a first selection signal, the group selection circuit selects some of the clock signals as a plurality of intermediate signals. The signal output circuit includes a multiplexer, which is controlled by a second selection signal to select one of the intermediate signals as a reference clock of the signal output circuit to output data. The clock distribution network transmits the intermediate signals from the group selection circuit to the multiplexer.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 5 shows an exemplary signal output circuit DQ-TX-n, which may be any of the signal output circuits DQ-TX-0 to DQ-TX-15 in FIG. 4;

FIG. 7 shows an exemplary output circuit NDQ-TX-n, which may be any of the signal output circuits NDQ-TX-0 to NDQ-TX-15 in FIG. 6;

FIG. 8 is a table that exemplifies operation rules of a group selection circuit 64L;

DETAILED DESCRIPTION OF THE INVENTION

In non-limiting embodiments of the disclosure, a DDR receiver and a DDR transmitter are utilized as an example of parallel transmission. In other embodiments, any signal transmitter or integrated circuit based on parallel transmission may be applied.

Figure 1:
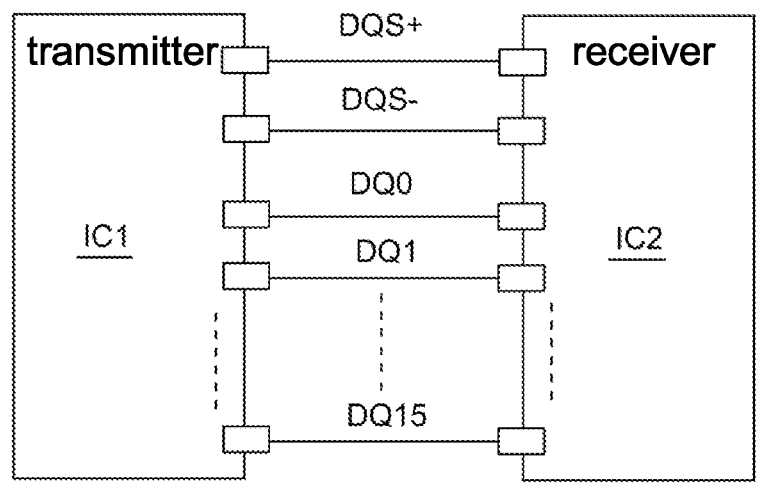
FIG. 1 shows two integrated circuits IC1 and IC2 that adopt the double data rate (DDR) standard for communication.

FIG. 1 shows two integrated circuits IC1 and IC2 that adopt the DDR standard for communication. On a printed circuit board, between the two integrated circuits IC1 and IC2 are many conducting lines serving as communication channels between the integrated circuits IC1 and IC2. Signals DQS+ and DQS− on two conducting lines form a pair of differential signals that represent a data queue strobe. Data bits DQ0 to DQ15 respectively transmitted on 16 conducting lines form two data bytes or a data word. As specified by the DDR standard, a rising edge and a falling edge of a data queue strobe may define time points at which the integrated circuits IC1 and IC2 send or receive the data bits DQ0 to DQ7.

In the description below, unless otherwise stated, the integrated circuit IC1 serves as a transmitter and the integrated circuit IC2 serves as a receiver. In other embodiments, roles of the integrated circuits IC1 and IC2 may be swapped.

Figure 2:
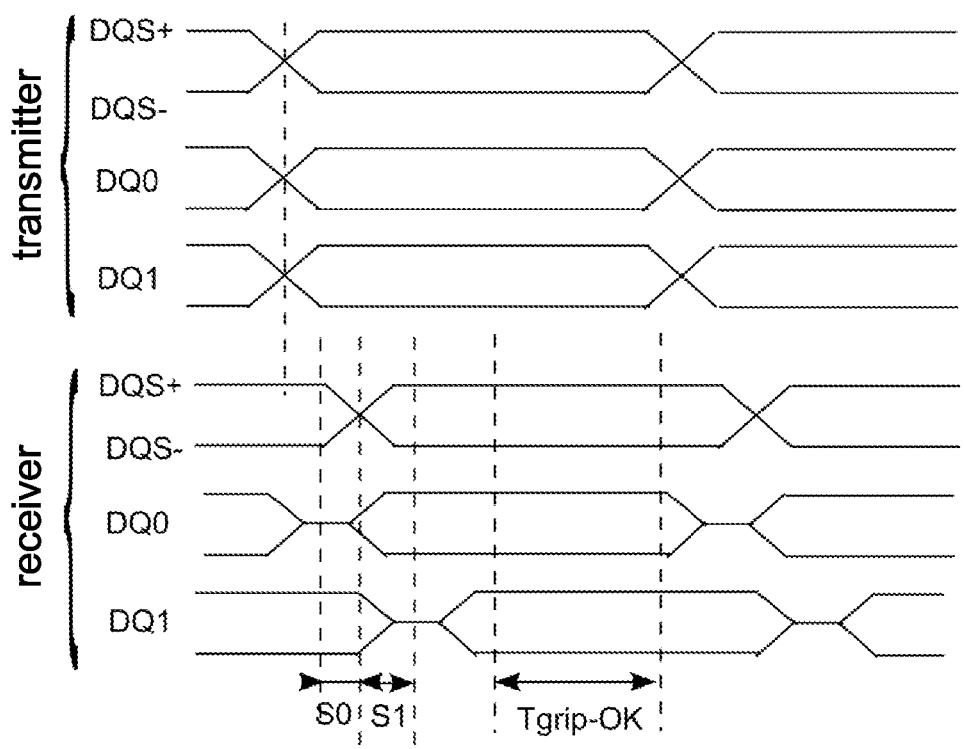
FIG. 2 shows signals DQS+ and DQS− and data bits DQ0 and DQ1 transmitted by a transmitter and received by a receiver when the DDR protocol is adopted.

As shown in FIG. 2, switching of the data queue strobe of a transmitter is synchronous with switching of the data bits DQ0 and DQ1 of the transmitter. In FIG. 2, signal propagation delays of the signals DQS+ and DQS− and the data bits DQ0 and DQ1 before these signals arrive at a receiver are also depicted. From perspectives of the receiver, the data bit DQ0 is earlier than a time point at which S0 appears in the signals DQS+ and DQS−, and the signals DQS+ and DQS− are earlier than a time point at which S1 appears in the data bit DS1. Such occurrence is the so-called skew. FIG. 2 shows a safe data fetching period Tgrip-OK, in which the receiver may correctly and simultaneously fetch the data bits DQ0 and DQ1. Also seen from FIG. 2, as the transmission speed increases, i.e., as the switching frequency of the signals DQS+ and DQS− increases, the period Tgrip-OK correspondingly decreases.

Figure 3:
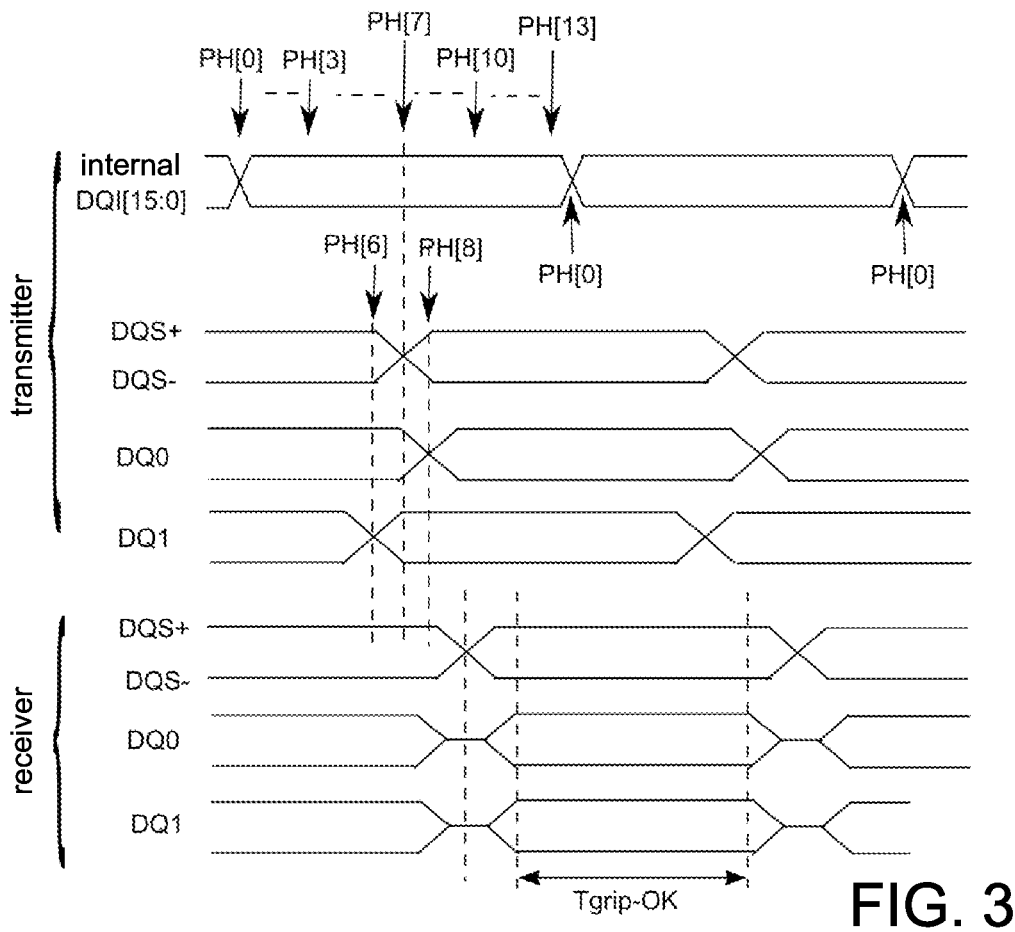
FIG. 3 shows internal data bits DQI[15:0], and signals DQS+ and DQS−, and data bits DQ0 and DQ1 transmitted by a transmitter and received by a receiver, when the transmitter supports a deskew function.

Measures at the receiver alone may be insufficient against the skew for high transmission speeds or long channel lengths. FIG. 3 shows a signal timing generated by a deskew method applied at a transmitter. Assuming that characteristics of signal propagation delays of individual channels are known to a transmitter, the transmitter may perform temporary compensation in advance for data bit signals to be transmitted. The transmitter comprises signal output circuits to transmit signals DQS+ and DQS− as well as the data bits DQ1 to DQ15. The data bits DQ[15:0] represent a set of 16 data bits DQ0, DQ1 . . . DQ15, and also represents two data bytes, or a data word. Each signal output circuit for outputting data bits captures a corresponding internal data bit according to a clock signal and outputs a corresponding data bit to a channel. The clock signals adopted by individual signal output circuits have the same frequency with however the phases being not necessarily the same. Referring to an example in FIG. 3, the transmitter may have 14 clock signals, which are respectively PH[0] to PH[13]. The signals DQS+ and the DQS− are substantially the clock signal PH[7]. The data bit DQ0 on the channel is generated from capturing an internal data bit DQI0 according to the clock signal PH[8]; the data bit DQ1 is generated from capturing an internal data bit DQI1 according to the clock signal PH[6]. In other words, the transmitter sequentially sends the data bit DQ1, the signals DQS+ and DQS−, and then the data bit DQ0. It is also observed from the example in FIG. 3, although the signal propagation delays are different, the signals DQS+ and DQS− as well as the data bits DQ0 and DQ1 are capable of arriving at the receiver substantially at the same time. The safe data fetching period Tgrip-OK in FIG. 3 is quite noticeable, and is greater than the safe data fetching period Tgrip-OK in FIG. 2, hence the receiver has a greater possibility and more chances of fetching correct data from the channels.

Figure 4:
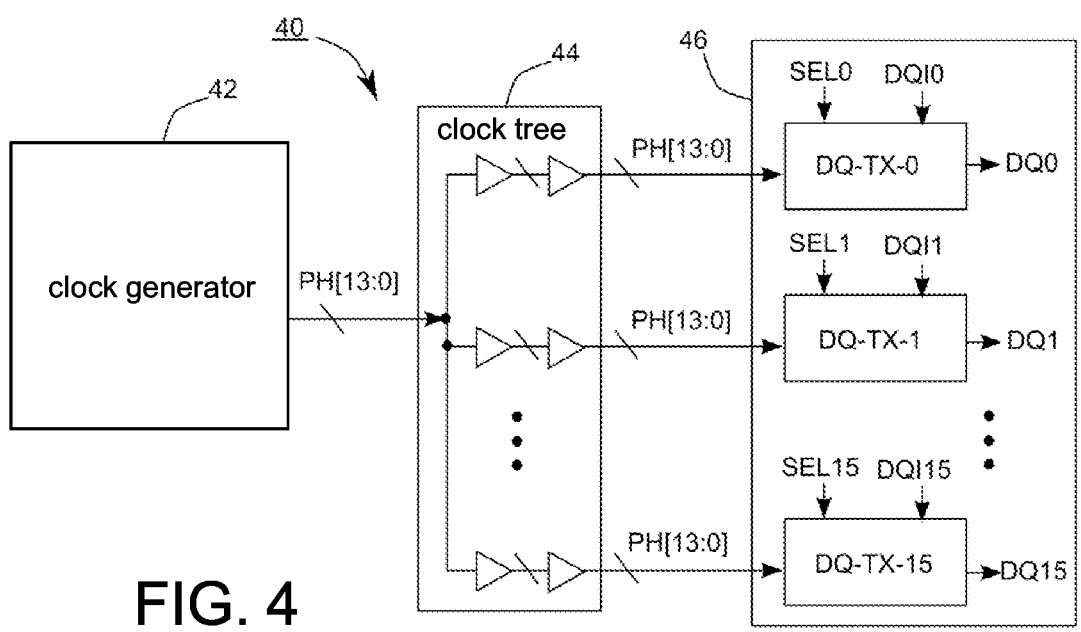
FIG. 4 shows an integrated circuit 40 of a transmitter capable of realizing the method in FIG. 3.

FIG. 4 shows an integrated circuit 40, which serves as a transmitter for realizing the method in FIG. 3 and is suitable for the integrated circuit IC1 in FIG. 1. A clock generator 42 formed by a phase locked loop (PLL) generates 14 clocks signals PH[13:0] with different phases (or denoted as PH[0] to PH[13] according to sequences of the phases). A clock tree 44 is a clock distribution network that assigns substantially the same signal propagation delay period to the clock signals PH[0] to PH[13] and distributes the clock signals PH[0] to PH[13] to 16 signal output circuits DQ-TX-0 to DQ-TX-15 in an input/output circuit 46, with each of the signal output circuits receiving the clock signals PH[0] to PH[13]. FIG. 5 shows an example of a signal output circuit DQ-TX-n, which may be any of the signal output circuits DQ-TX-0 to DQ-TX-15. The signal output circuit DQ-TX-n may comprise a 14-to-1 multiplexer, and selects one of the clock signals PH[0] to PH[13] to serve as a reference clock CLK-DQ-n according to a selection signal SELn. A D flip-flop captures an internal data bit DQin according to the reference clock CLK-DQ-n to generate a data bit DQn.

Although the integrated circuit 40 can achieve deskew at the transmitter, several drawbacks below are nevertheless present. First of all, power and silicon area consumed by the clock tree 44 may be considerable. With minimal amount of skew generated, the clock tree 44 needs to simultaneously distribute the 14 clock signals PH[13:0] to the signal output circuits DQ-T0 to DQ-TX15. Thus, it can be understood that the clock tree 44 requires large amounts of sophisticated fine-tuning and control procedures that consume considerable amounts of power and silicon area. Further, the silicon area occupied by each signal output circuit DQ-TX-n is also quite sizable. Further, the DDR communication protocol involves a large number of signal output circuits for parallel transmission of data bits. If each signal output circuit in the integrated circuit 40 needs such 14-to-1 multiplexer that occupies a large circuit area, the integrated circuit 40 is caused to have extremely high circuit costs and thus low competitiveness.

Figure 6:
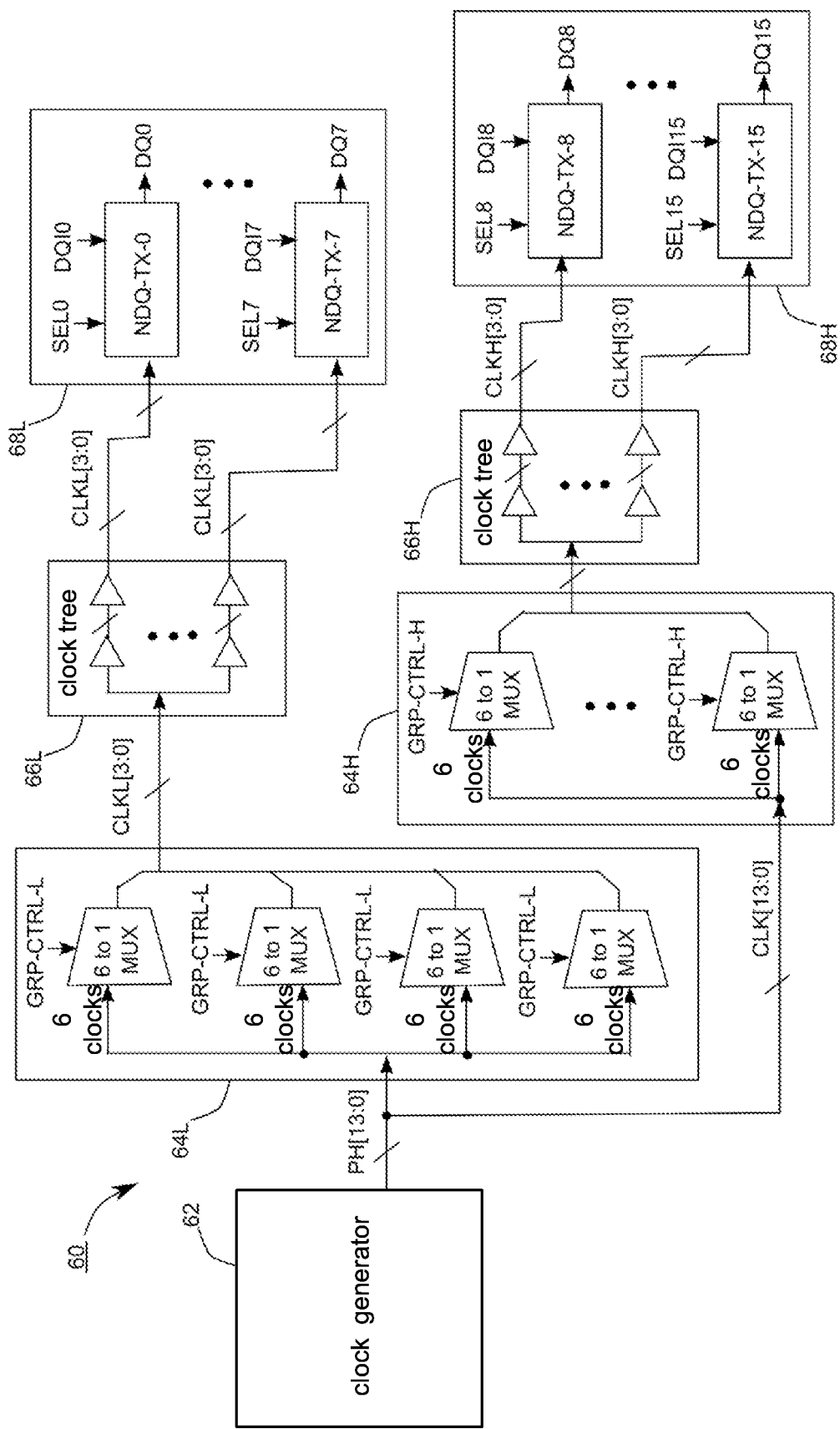
FIG. 6 shows an integrated circuit 60 of a transmitter also capable of realizing the method in FIG. 3.

FIG. 6 shows an integrated circuit 60, which serves as a transmitter for realizing the method in FIG. 3 and is also suitable for the integrated circuit in FIG. 1. The integrated circuit 60 similarly includes a clock generator 62, group selection circuits 64L and 64H, clock trees 66L and 66H, and input/output circuits 68L and 68H. As shown in FIG. 6, the group selection circuit 64L, the clock tree 66L and the input/output circuit 68L are for outputting the data byte formed by the data bits DQ0 to DQ7; the group selection circuit 64H, the clock tree 66H and the input/output circuit 68H are for outputting another data byte formed by the data bits DQ8 to DQ15. For the sake of simplicity, details and operations of the group selection circuit 64H, the clock tree 66H and the input/output circuit 68H can be referred from the description of the group selection circuit 64L, the clock tree 66L and the input/output circuit 68L, and are omitted herein.

The clock generator 62 generates 14 clocks signals PH[0] to PH[13] with different phases. According to a selection signal GRP-CTRL-L, the group selection circuit 64L selects four clock signals from the clocks signals PH[0] to PH[13], and outputs the selected clock signals as four intermediate signals CLK[3:0]. In the embodiment, the selected clock signals have adjacent phases. In other words, the selection signal GRP-CTRL-L determines the intermediate signals CLKL[3:0]. It is to be shortly explained that, in the embodiment, the group selection circuit 64L includes four multiplexers each selecting one from six different clock signals to serve as one of the four intermediate signals. For example, the intermediate signals CLKL[3:0] may be the clock signals PH[5], PH[6], PH[7] and PH[8]. In short, the intermediate signals CLKL[3:0] may be formed by four clock signals PH[m], PH[m+1], PH[m+2] and PH[m+3], where m may be an integral between 0 and 13.

The clock tree 66L distributes the intermediate signals CLKL[3:0] to the input/output circuit 68L, which includes eight signal output circuits NDQ-TX-0 to NDQ-TX-7. The signal output circuits NDQ-TX-0 to NDQ-TX-7 output one data byte formed by the data bits DQ0 to DQ7 to another integrated circuit (not shown). FIG. 7 shows an example of a signal output circuit NDQ-TX-n, which may be any of the signal output circuits NDQ-TX-0 to NDQ-TX15 in FIG. 6. According to the control of a selection signal SELn, the signal output circuit NDQ-TX-n utilizes a 4-to-1 multiplexer to select one of the intermediate signals CLKL[3:0] or CLKH[3:0] to serve as a reference clock CLK-DQ-n. According to the reference clock CLK-DQ-n, the D flip-flop in FIG. 7 captures an internal data bit DQin to generate a data bit DQn.

The reference clocks of the signal output circuits NDQ-TX-O to NDQ-TX-7 are selected from the intermediate signals CLKL[3:0]; the reference clocks of the signal output circuits NDQ-TX-8 to NDQ-TX-15 are selected from the intermediate signals CLKH[3:0].

As shown in FIG. 6, the group selection circuit 64L includes four 6-to-1 multiplexers, each of which provides one of the intermediate signals CLKL[3:0]. The table in FIG. 8 exemplifies operation rules of the group selection circuit 64L. When the selection signal GRP-CTRL-L is "0", the intermediate signals CLKL[3:0] are formed by the clock signals PH[0], PH[1], PH[2] and PH[3]; when the selection signal GRP-CTRL-L is "1", the intermediate signals CLKL[3:0] are formed by the clock signals PH[2], PH[3], PH[4] and PH[5]; and so forth. It is also discovered from FIG. 8 that, the clock signal group selected by the selection signal GRP-CTRL-L in "0" partially overlaps with the clock signal group selected by the selection signal by two clock signals—PH[2] and PH[3]. In FIG. 8, the inputs and output of each 6-to-1 multiplexer are also defined. For example, the six inputs of the 6-to-1 multiplexer that provides the intermediate signal CLKL[0] are PH[0], PH[2], PH[4], PH[6], PH[8] and PH[10].

For example, to achieve the result in FIG. 3, the selection signal GRP-CTRL-L in FIG. 6 is "3"; the intermediate signals CLKL[3:0] are formed by the clock signals PH[6], PH[7], PH[8] and PH[9]; the signal output circuit NDQ-TX-0 utilizes the intermediate signal CLKL[2], i.e., the clock signal PH[8], as the reference clock; the signal output circuit NDQ-TX-1 utilizes the intermediate signal CLKL[0], i.e., the clock signal PH[6], as the reference signal.

Figure 9:
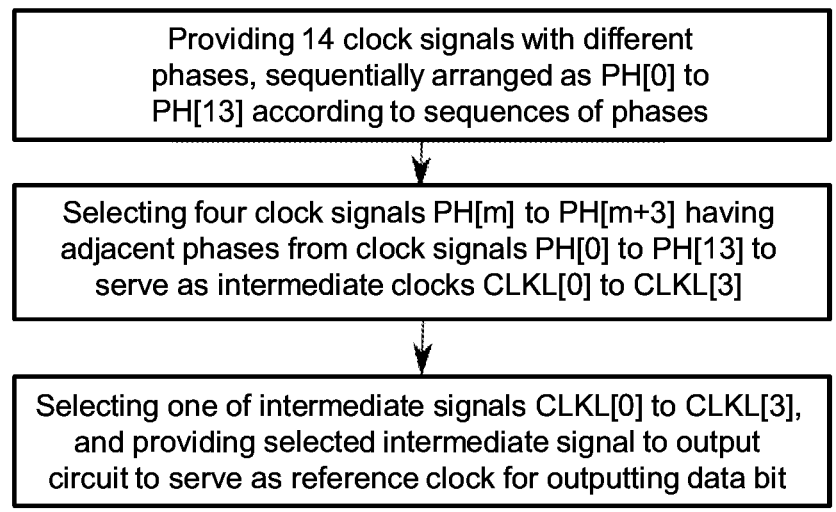
FIG. 9 is a signal processing method performed in the integrated circuit 60.

FIG. 9 shows a signal processing method carried out in the integrated circuit 60. Details of the signal processing method may be obtained based on the teaching and description of the integrated circuit 60 in FIG. 6, and shall be omitted herein.

Each of the signal output circuits in FIG. 4 selects one from the 14 clock signals PH[13:0] to serve as a reference signal. Each of the signal output circuits NDQ-TX-0 to DNQ-TX-7 in FIG. 6 selects one of the four intermediate signals to serve as a reference clock. A reason for the approach in FIG. 6 is that, the signal propagation delay periods for the data bits of the same data byte arriving at the receiver do not differ much. Thus, when the transmitter adopt clock signals with different phases for deskew, the phases of the clock signals adopted do not differ much from one another. Therefore, the integrated circuit 60 in FIG. 6 first selects a plurality of clock signals with adjacent phases as the intermediate signals CLKL[3:0], and each of the signal output circuits (NDQ-TX-0 to NDQ-TX7) then selects one of the intermediate signals CLKL[3:0] as the reference signal.

Compared to the integrated circuit 40 in FIG. 4 that simultaneously distributes 14 clocks signals PH[0] to PH[13] to each of the signal output circuits, the integrated circuit 60 in FIG. 6 is required to simultaneously distribute the intermediate signals CLKL[3:0] formed by four clock signals to each of the signal output circuits. It can be easily appreciated that the clock tree 66L and the input/output circuit 68L in the integrated circuit 60 are advantaged by being simpler and having lower costs. Compared to the integrated circuit 40, although the integrated circuit 60 additionally includes the group selection circuits 64L and 64H, the integrated circuit 60 yet has lower overall application and production costs.

To ensure the deskew capabilities of the integrated circuits 40 and 60, the integrated circuits 40 and 60 first need to know which of the clock signals PH[0] to PH[13] the signal output circuits NDQ-TX-0 to NDQ-TX15 individually utilize as the reference clock. In one approach, the integrated circuit 40 or 60 is designed to write a set of verification code data formed by multiple test data words to another integrated circuit (not shown), and the data bits that the integrated circuits 40 and 60 previous wrote into the another integrated circuit are read to check whether the data bits are consistent with expected values to further determine whether the another integrated circuit can correctly receive these data bits. Such process is referred to as a loop mode. The loop mode can be iterated for a number of times by changing the reference clock to identify an applicable phase range of a clock signal for a specific signal output circuit.

Figure 10:
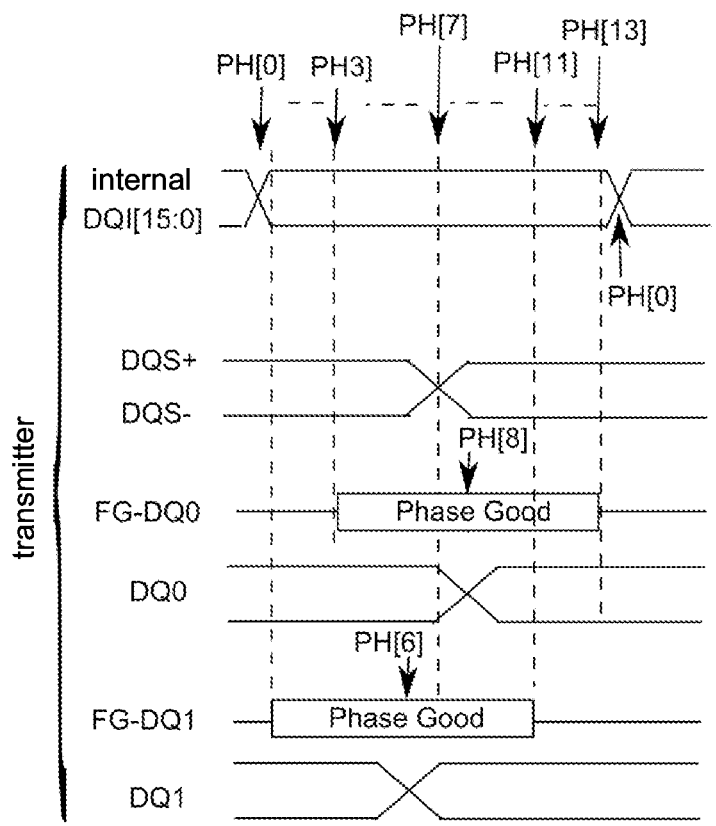
FIG. 10 shows applicable phase ranges of clock signals for the signal output circuits NDQ-TX-0 and NDQ-TX-1.

For example, all of the signal output circuits in the integrated circuits 60 are rendered to utilize the clock signal PH[0] as the reference signal, another integrated circuit (not shown) is adopted as the receiver, and the loop mode is performed. A possible result of the loop mode is given as an example for illustration purposes below. For the entire verification code data, assume that at least one of the written results of the data bit DQ0 to the another integrated circuit is inconsistent with the expected value of the integrated circuit 60. Thus, the clock signal PH[0] is unsuitable for the signal output circuit NDQ-TX-0. Conversely, if the written results of the data bit DQ1 are completely consistent with the expected values, it means that the phase of the clock signal PH[0] is suitable for the signal output circuit NDQ-TX-1. Next, all of the signal output circuits in the integrated circuits 60 are rendered to utilize the clock signal PH[1] as the reference signal, and the loop mode is again performed to determine whether the clock signal PH[1] is suitable for a specific signal output circuit. As such, the loop mode is conducted for all of the clock signals PH[0] to PH[13] to identify which of the clock signals that each of the signal output circuits utilizes as the reference clock, so that the written results of the another integrated circuit that serves as a receiver are correct. In FIG. 10, for example, the diagram FG-DQ0 shows that the reference clock of the signal output circuit NDQ-TX-0 may be any of the clock signals PH[3] to PH[13], and the diagram FG-DQ1 shows that the reference clock of the signal output circuit NDQ-TX-1 may be any of the clock signals PH[0] to PH[11].

The integrated circuit 40 or 60 may select a median of the applicable clock signals corresponding to a signal output circuit and utilize the median as the reference clock of the signal output circuit. Taking FIG. 10 for example, the clock signals PH[3] to PH[13] are all applicable to the signal output circuit NDQ-TX-0, with a median being about the clock signal PH[8]. Thus, the integrated circuit 60 generates appropriate selection signals GRP-CTRL-L and SEL0 to select the clock signal PH[8] as the reference clock of the signal output circuit NDQ-TX-0. Similarly, the median of the clock signals PH[0] to PH[11] is about the clock signal PH[6], and so the integrated circuit 60 selects the clock signal PH[6] as the reference clock of the signal output circuit NDQ-TX-1. By selecting the median of the clock signals as the reference signal, the safe data fetching period Tgrip-OK of the receiver can be maximized.

Given the signal output circuit selects a clock signal with an appropriate phase as the reference signal, the integrated circuit 40 or 60 that serves as a transmitter is capable of achieving a deskew effect. Further, circuit costs and power consumption of the integrated circuit 60 are lower than those of the integrated circuit 40.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal transmission method, suitable for a signal transmitter, comprising:
   providing a plurality of clock signals with different phases;
   selecting some of the clock signals as a plurality of intermediate signals;
   transmitting the intermediate signals to a signal output circuit of the signal transmitter via a clock distribution network; and
   selecting one of the intermediate signals as a reference clock of the signal output circuit to output a set of data.

2. The signal transmission method according to claim 1, wherein the signal transmitter comprises eight signal output circuits that output a data byte, and the reference clock of each of the signal output circuits is selected from the intermediate signals.

3. The signal transmission method according to claim 1, the intermediate signals being a plurality of first intermediate signals, the method further comprising:
   selecting some of the clock signals as a plurality of second intermediate signals; and
   selecting one of the second intermediate signals as a reference clock of another signal output circuit of the signal transmitter to output another set of data.

4. The signal transmission method according to claim 3, wherein the signal transmitter comprises eight high-byte signal output circuits and eight low-byte signal output circuits that output a data word; the reference clock of each of the high-byte signal output circuits is selected from the first intermediate signals; the reference clock of each of the low-byte signal output circuits is selected from the second intermediate signals.

5. The signal transmission method according to claim 1, further comprising:
   utilizing the clock signals as the reference clock of the signal output circuit, respectively, to output a set of data, and determining whether a signal receiver correctly receives the data outputted from the signal output circuit to accordingly determine the intermediate signals selected from the clock signals.

6. The signal transmission method according to claim 1, further comprising:
   providing a first selection signal to determine the intermediate signals; and
   providing a second selection signal to select one of the intermediate signals as the reference clock.

7. The signal transmission method according to claim 6, wherein when the first selection signal is a first value, the intermediate signals are a first group of clock signals; when the first selection signal is a second value, the intermediate signals are a second group of clock signals; the first group of clock signals partially overlap with the second group of clock signals.

8. The signal transmission method according to claim 7, wherein the intermediate signals have adjacent phases.

9. A signal transmitter, comprising:
   a clock generator, configured to provide a plurality of clock signals with different phases;
   a group selection circuit, configured to select some of the clock signals as a plurality of intermediate signals according to a first selection signal;
   a signal output circuit, comprising a multiplexer controlled by a second selection signal to select one of the intermediate signals as a reference clock of the signal output circuit to output data; and
   a clock distribution network, configured to transmit the intermediate signals from the group selection circuit to the multiplexer.

10. The signal transmitter according to claim 9, further comprising:
    another signal output circuit, comprising another multiplexer controlled by a third selection signal to select one of the intermediate signals as a reference clock of the another output signal circuit to output data.

11. The signal transmitter according to claim 9, wherein the group selection circuit comprises a plurality of multiplexers each outputting one of the intermediate signals.

12. The signal transmitter according to claim 9, wherein the signal output circuit comprises a flip-flop, which captures a data bit that serves as the data outputted from the signal output circuit according to the reference clock as a clock.

13. The signal transmitter according to claim 9, comprising eight signal output circuits for outputting a data byte, the reference clock of each of the signal output circuits being one of the intermediate signals.

14. The signal transmitter according to claim 9, wherein when the first selection signal is a first value, the intermediate signals are a first group of clock signals; when the first selection signal is a second value, the intermediate signals are a second group of clock signals; the first group of clock signals partially overlap with the second group of clock signals.

15. The signal transmitter according to claim 9, wherein the intermediate signals have adjacent phases.

* * * * *